(No Model.)
J. G. BUBACH.
PRUNING SHEARS.
No. 298,548. Patented May 13, 1884.
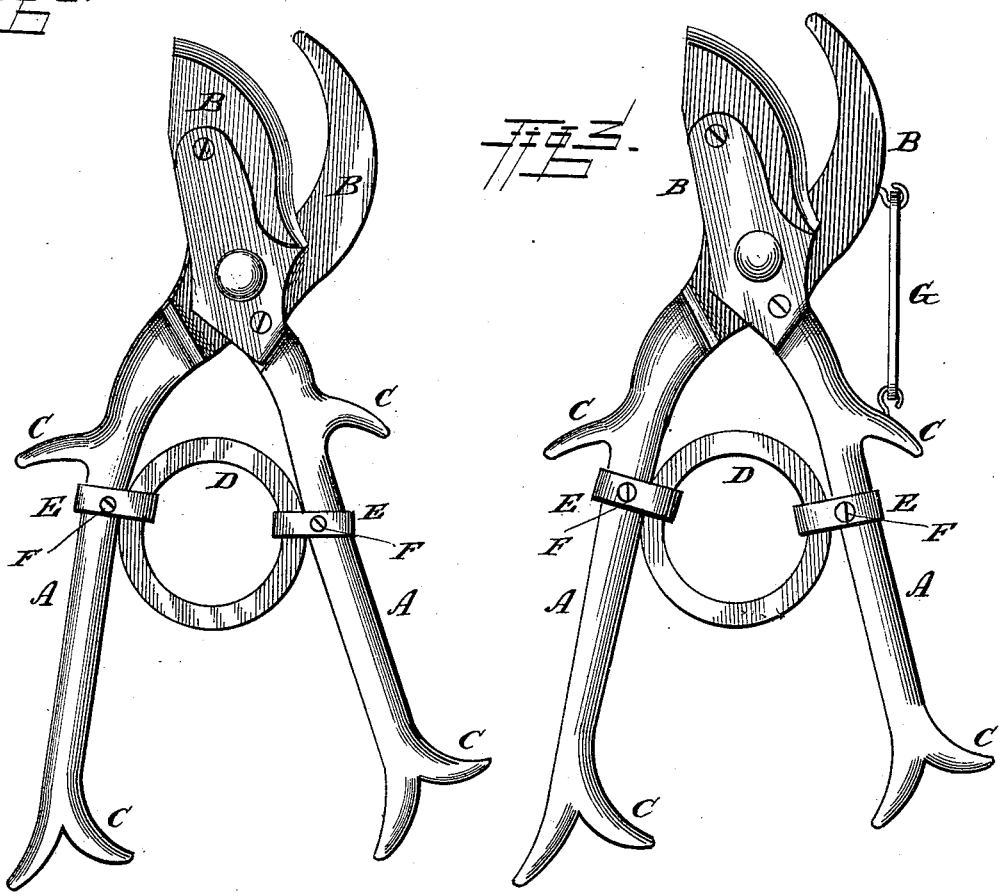
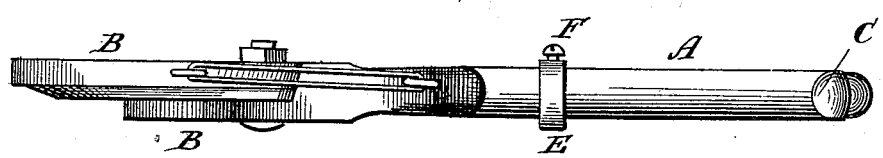
WITNESSES:
Fred. G. Dieterich
Arthur L. Morsell
John G. Bubach
INVENTOR.
By Louis Bagger & Co.,
ATTORNEYS.
N. PETERS, Photo-Lithographer, Washington, D. C.

UNITED STATES PATENT OFFICE.

JOHN G. BUBACH, OF PRINCETON, ILLINOIS.

PRUNING-SHEARS.

SPECIFICATION forming part of Letters Patent No. 298,548, dated May 13, 1884.

Application filed February 19, 1884. (No model.)

*To all whom it may concern:*

Be it known that I, JOHN G. BUBACH, a citizen of the United States, and a resident of Princeton, in the county of Bureau and State of Illinois, have invented certain new and useful Improvements in Pruning-Shears; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved pruning-shears. Fig. 2 is an edge view of the same, and Fig. 3 illustrates a modified construction.

Similar letters of reference indicate corresponding parts in all the figures.

My invention has relation to pruning-shears or implements of a like nature; and it consists in constructing the handle of the same with an improved adjustable rubber spring, as hereinafter more fully described and claimed.

In the accompanying drawings, A A denote the handles of the shears, the blades of which are shown at B. These handles are made with the usual projections, C, adapted to fit the hand, so that the operator may obtain a firm grip on the implement.

Placed between the handles is a circular rubber ring, D, which is held in place between the handles by sleeves or keepers E, which may be adjusted up or down upon their respective handles, and which, when adjusted to their proper position, so as to bring the circular rubber spring in its proper position between the handles, may be fixed by means of the set-screws F. It will be seen that this rubber spring operates to keep the handles apart, so as to keep the blades open, in like manner as the steel spring usually used for the same purpose; but by the use of a steel spring between the handles the hand of the operator is apt to get caught and pinched between the spring and one of the handles in using the implement, and metal springs of steel or brass are constantly breaking. This I prevent by the use of my annular rubber spring, and even if the palm of the hand should get caught between the handles and the spring, the latter, being of rubber, will yield, so as not to wound the hand or otherwise cause injury. By making the sleeves E adjustable upon the handles the spring may be adjusted up or down, so as to regulate the pressure which it is desired that the spring shall exercise against the two handles. If desired, a strong rubber strap, G, may be fastened at one end to one of the projections C and at the other end to one of the blades, so as to operate in conjunction with the circular spring D, which is interposed between the handles to keep the blades open.

Having thus described my invention, I claim and desire to secure by Letters Patent of the United States—

The combination, in a pair of pruning-shears, of the handles A A, circular rubber spring or ring D, adjustable sleeves or keepers E, and set-screws F, for fixing the same in their adjusted position upon the handles, substantially as set forth.

In testimony that I claim the foregoing as my own I have hereunto affixed my signature in presence of two witnesses.

JOHN G. BUBACH.

Witnesses:
D. H. SMITH,
A. M. SWENGEL.